(12) United States Patent
Mokerji

(10) Patent No.: US 6,268,060 B1
(45) Date of Patent: *Jul. 31, 2001

(54) CHROME COATING HAVING A SILICONE TOP LAYER THEREON

(75) Inventor: Subrata Mokerji, Shelby Township, MI (US)

(73) Assignee: MascoTech Coatings, Inc., China Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/905,205

(22) Filed: Aug. 1, 1997

(51) Int. Cl.$^7$ ..................................................... B32B 9/04
(52) U.S. Cl. ........................ 428/446; 428/447; 428/450; 428/458; 428/480; 428/469
(58) Field of Search .................... 428/458, 480, 428/469, 446, 447, 450

(56) References Cited

U.S. PATENT DOCUMENTS

| | | | |
|---|---|---|---|
| 2,316,303 | 4/1943 | Wesley et al. | 428/611 |
| 2,432,893 | 12/1947 | Holt | 205/256 |
| 2,653,128 | 9/1953 | Brenner | 205/238 |
| 2,926,124 | 2/1960 | Taylor | 205/252 |
| 3,090,733 | 5/1963 | Brown | 428/639 |
| 3,771,972 | 11/1973 | Schaer et al. | 428/613 |
| 3,772,168 | 11/1973 | Dillenberg | 205/253 |
| 3,887,444 | 6/1975 | Fueki et al. | 205/253 |
| 3,925,276 * | 12/1975 | Merrill | 428/412 |
| 3,940,319 | 2/1976 | Pollack | 205/253 |
| 3,986,997 * | 10/1976 | Clark | 524/300 |
| 4,027,073 * | 5/1977 | Clark | 428/212 |
| 4,029,556 | 6/1977 | Monaco et al. | 205/143 |
| 4,033,835 | 7/1977 | Lerner et al. | 205/253 |
| 4,049,508 | 9/1977 | Morrissey | 205/252 |
| 4,226,082 | 10/1980 | Nishida | 368/285 |
| 4,252,862 | 2/1981 | Nishida | 428/627 |
| 4,418,125 | 11/1983 | Henricks | 428/639 |
| 4,556,607 | 12/1985 | Sastri | 428/627 |
| 4,632,857 | 12/1986 | Mallory, Jr. | 428/209 |
| 4,640,869 | 2/1987 | Loth | 428/469 |
| 4,699,850 | 10/1987 | Kishi et al. | 428/469 |
| 4,761,346 | 8/1988 | Naik | 428/627 |
| 4,791,017 | 12/1988 | Hofmann et al. | 428/216 |
| 4,847,445 | 7/1989 | Helderman et al. | 174/256 |
| 4,849,303 | 7/1989 | Graham et al. | 428/670 |
| 4,911,798 | 3/1990 | Abys et al. | 205/238 |
| 4,925,394 | 5/1990 | Hayashi et al. | 439/86 |
| 5,024,733 | 6/1991 | Abys et al. | 205/257 |
| 5,102,509 | 4/1992 | Albon et al. | 205/257 |
| 5,178,745 | 1/1993 | Abys et al. | 205/219 |
| 5,250,105 | 10/1993 | Gomes et al. | 106/1.11 |
| 5,314,608 | 5/1994 | Caballero | 205/238 |
| 5,413,874 | 5/1995 | Moysan, III et al. | 428/627 |
| 5,476,724 | 12/1995 | Moysan, III et al. | 428/627 |
| 5,478,659 | 12/1995 | Moysan, III et al. | 428/627 |
| 5,478,660 | 12/1995 | Moysan, III et al. | 428/627 |
| 5,482,788 | 1/1996 | Moysan, III et al. | 428/627 |

(List continued on next page.)

FOREIGN PATENT DOCUMENTS

| | | |
|---|---|---|
| 56-166063 | 12/1981 | (JP) . |
| 59-9189 | 1/1984 | (JP) . |

OTHER PUBLICATIONS

Electroplating, Frederick A. Lowenheim, pp. 210–225 (Admitted Prior Art).

Modern Electroplating, Frederick A. Lowenheim, The Electrochemical Society, Inc., NY, 1942, pp. 279, 280.

*Primary Examiner*—Leszek Kiliman
(74) *Attorney, Agent, or Firm*—Myron B. Kapustij; Lloyd D. Doigan

(57) ABSTRACT

An article is coated with a multi-layer coating comprising a polymeric layer deposited on the surface of the article, a chrome layer deposited on the polymeric layer, and a silicone resin layer deposited on the chrome layer.

7 Claims, 1 Drawing Sheet

U.S. PATENT DOCUMENTS

| | | | |
|---|---|---|---|
| 5,484,663 | 1/1996 | Moysan, III et al. | 428/627 |
| 5,552,233 | 9/1996 | Moysan, III et al. | 428/627 |
| 5,589,280 * | 12/1996 | Gibbons | 428/626 |
| 5,626,972 | 5/1997 | Moysan, III et al. | 428/627 |
| 5,639,564 | 6/1997 | Moysan, III et al. | 428/627 |
| 5,641,579 | 6/1997 | Moysan, III et al. | 428/627 |
| 5,648,179 | 7/1997 | Moysan, III et al. | 428/627 |
| 5,654,108 | 8/1997 | Moysan, III et al. | 428/627 |
| 5,667,904 | 9/1997 | Moysan, III et al. | 428/627 |

* cited by examiner

CHROME COATING HAVING A SILICONE TOP LAYER THEREON

FIELD OF THE INVENTION

The instant invention relates to a substrate having a leveling plastic coating thereon, a decorative chrome layer on the plastic coating, and a protective silicone coating over the chrome layer.

SUMMARY OF THE INVENTION

In accordance with this invention a polymeric basecoat is provided on the surface of the substrate. The polymeric basecoat provides a leveling effect to the surface of the substrate. A decorative chrome layer is then applied onto the basecoat. A protective silicone resin top coat is provided over the chrome layer.

BACKGROUND OF THE INVENTION

Thin chrome layers have been applied by electroplating or vapor deposition onto the surfaces of various substrates to provide a decorative and shiny appearance thereto. However, the substrates have had to be pretreated as by polishing, cleaning and the like to remove any scratches or other imperfections from their surfaces before the chrome layer is applied thereon. Otherwise, the chrome layer will enhance and accentuate these imperfections. Also, the chrome layer is subject to abrasion, scratching and weathering, particularly if it is applied onto a part of a vehicle such as, for example, a wheel cover.

The present invention provides a substrate having a decorative chrome layer which is not subject to the aforementioned disadvantages.

DESCRIPTION OF THE PREFERRED EMBODIMENT

Figure 1:
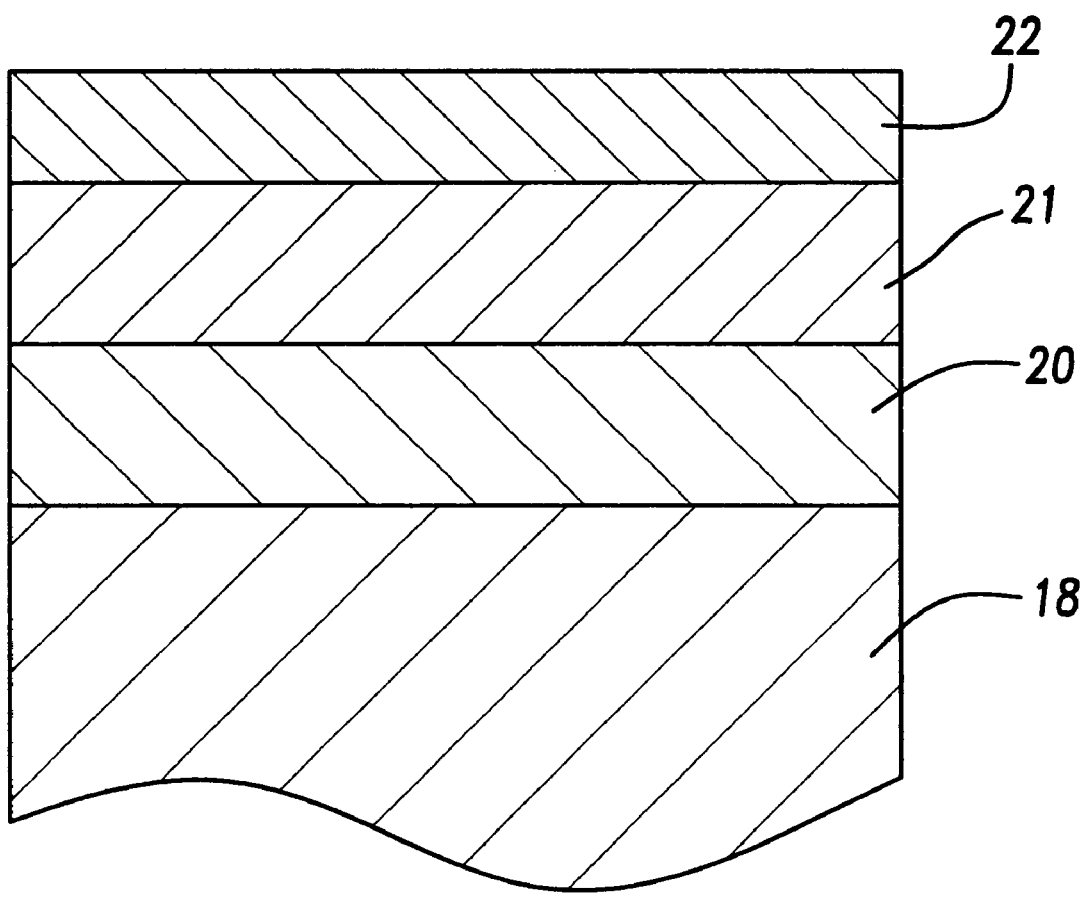
FIG. 1 is a cross-sectional view, not to scale of a portion of the substrate having the multi-layer coating on its surface.

The article or substrate 18 can be comprised of any suitable material such as plastic, ceramic, metal or metal alloy. The metals include nickel, aluminum, copper, steel and zinc. The metal alloys include nickel alloys and brass. The plastics forming the substrate include polycarbonates, nylon, acrylonitrile-butadienestyrene, polyesters, polyvinylchlorides, and the like. In one embodiment the article is part of a vehicle, such as for example, a wheel cover.

Over the surface of the substrate 18 is deposited a polymeric or resinous layer 20. The polymeric or resinous layer or basecoat 20 may be comprised of both thermoplastic and thermoset polymeric or resinous material. These polymeric or resinous materials include the well known, conventional and commercially available polycarbonates, polyacrylates, polymethacrylates, nylons, polyesters, polypropylenes, polyepoxies, alkyds and styrene containing polymers such as polystyrene, styrene-acrylonitrile (SAN), styrene-butadiene, acrylonitrile-butadiene-styrene (ABS), and blends and copolymers thereof.

The polycarbonates are described in U.S. Pat. Nos. 4,579,910 and 4,513,037, both of which are incorporated herein by reference.

Nylons are polyamides which can be prepared by the reaction of diamines with dicarboxylic acids. The diamines and dicarboxylic acids which are generally utilized in preparing nylons generally contain from two to about 12 carbon atoms. Nylons can also be prepared by additional polymerization. They are described in "Polyamide Resins", D. E. Floyd, Reinhold Publishing Corp., New York, 1958, which is incorporated herein by reference.

The polyepoxies are disclosed in "Epoxy Resins", by H. Lee and K. Neville, McGraw-Hill, New York, 1957, and in U.S. Pat. Nos. 2,633,458; 4,988,572; 4,680,076; 4,933,429 and 4,999,388, all of which are incorporated herein by reference.

The polyesters are polycondensation products of an aromatic dicarboxylic acid and a dihydric alcohol. The aromatic dicarboxylic acids include terephthalic acid, isophthalic acid, 4,4'-diphenyl-dicarboxylic acid, 2,6-naphthalenedicarboxylic acid, and the like. Dihydric alcohols include the lower alkane diols with from two to about 10 carbon atoms such as, for example, ethylene glycol, propylene glycol, cyclohexanedimethanol, and the like. Some illustrative nonlimiting examples of polyesters include polyethylene terephthalate, polybutylene terephthalate, polyethylene isophthalate, and poly(1,4-cyclohexanedimethylene terephthalate). They are disclosed in U.S. Pat. Nos. 2,465,319; 2,901,466 and 3,047,539, all of which are incorporated herein by reference.

The polyacrylates and polymethacrylates are polymers or resins resulting from the polymerization of one or more acrylates such as, for example, methyl acrylate, ethyl acrylate, butyl acrylate, 2-ethylhexyl acrylate, etc., as well as the methacrylates such as, for instance, methyl methacrylate, ethyl methacrylate, butyl methacrylate, hexyl methacrylate, etc. Copolymers of the above acrylate and methacrylate monomers are also included within the term "polyacrylates or polymethacrylates" as it appears herein. The polymerization of the monomeric acrylates and methacrylates to provide the polyacrylate resins useful in the practice of the invention may be accomplished by any of the well known polymerization techniques.

The styrene-acrylonitrile and acrylonitrile-butadiene-styrene resins and their preparation are disclosed, inter alia, in U.S. Pat. Nos. 2,769,804; 2,989,517; 2,739,142; 3,991,136 and 4,387,179, all of which are incorporated herein by reference.

The alkyd resins are disclosed in "Alkyd Resin Technology", Patton, Interscience Publishers, NY, N.Y., 1962, and in U.S. Pat. Nos. 3,102,866; 3,228,787 and 4,511,692, all of which are incorporated herein by reference.

These polymeric materials may optionally contain the conventional and well known fillers such as mica, talc and glass fibers.

The polymeric layer or basecoat 20 may be applied onto the surface of the substrate by any of the well known and conventional methods such as dipping, spraying and brushing.

The polymeric layer 20 functions, inter alia, to level the surface of the substrate, cover any scratches or imperfections in the surface and provide a smooth and even surface for the deposition of the chrome layer.

The polymeric layer 20 has a thickness at least effective to level out the surface of the substrate. Generally, this thickness is from about 0.1 mils to about 10 mils, preferably from about 2 mils to about 5 mils, and more preferably from about 0.3 mils to about 1.5 mils.

The chrome layer 21 may be deposited on the plastic layer 20 by any of the conventional and well known chrome deposition techniques including vapor deposition such as physical vapor deposition and electroplating techniques. The electroplating techniques along with various chrome plating baths are disclosed in Brassard, "Decorative Electroplating—A Process in Transition", Metal Finishing, pp. 105–108, June 1988; Zaki, "Chromium Plating", PF Directory, pp. 146–160; and in U.S. Pat. Nos. 4,460,438, 4,234,396 and 4,093,522, all of which are incorporated herein by reference.

Chrome plating baths are well known and commercially available. A typical chrome plating bath contains chromic acid or salts thereof, and catalyst ion such as sulfate or fluoride. The catalyst ions can be provided by sulfuric acid or its salts and fluosilicic acid. The baths may be operated at a temperature of about 112°–116° F. Typically in chrome plating a current density of about 150 amps per square foot, at about five to nine volts is utilized.

Generally, the plating of trivalent chrome is preferred because of environmental considerations.

The vapor deposition of the chrome is conventional and well known in the art and includes techniques such as cathodic arc evaporation (CAE) or sputtering. Sputtering techniques and equipment are disclosed, inter alia, in J. Vossen and W. Kern "Thin film Processes II", Academic Press, 1991; R. Boxman et al, "Handbook of Vacuum Arc Science and Technology", Noyes Pub., 1995; and U.S. Pat. Nos. 4,162,954 and 4,591,418, all of which are incorporated herein by reference.

Briefly, in the sputtering deposition process a metal (i.e., chrome) target, which is the cathode, and the substrate are placed in a vacuum chamber. The air in the chamber is evacuated to produce vacuum conditions in the chamber. An inert gas, such as Argon, is introduced into the chamber. The gas particles are ionized and are accelerated to the target to dislodge titanium or zirconium atoms. The dislodged target material is then typically deposited as a coating film on the substrate.

In cathodic arc evaporation, an electric arc of typically several hundred amperes is struck on the surface of a metal cathode such as chrome. The arc vaporizes the cathode material, which then condenses on the substrates forming a coating.

The thickness of the chrome layer 21 is at least a thickness effective to provide a decorative appearance to the article. Generally this thickness is from about 200 Angstroms to about 35 microns, preferably from about 400 Angstroms to about 5,000 Angstroms.

Over the chrome layer 21 is applied a protective silicone resin top coat 22. The silicone resins or organopolysiloxanes which are utilized in the instant invention are conventional, well known and generally commercially available. They are disclosed, inter alia, in U.S. Pat. Nos. 3,375,223; 3,435,001; 3,450,672; 3,790,527; 3,832,319; 3,865,766; 3,888,815; 3,887,514; 3,925,276; 3,986,997; and U.S. Pat. No. 4,027,073, the disclosures of which are incorporated herein by reference.

The silicone resin is applied from a top coat composition containing a further-curable organopolysiloxane and, generally, solvents for the further curable organopolysiloxane. The top coat composition may be applied by standard and conventional techniques such as spraying, brushing, etc. over the chrome layer.

To cure the further curable organopolysiloxane and form the silicone resin top coat the top coat composition is then heated at a temperature and for a time effective to cure said further curable organopolysiloxane.

One particular class of further curable organopolysiloxanes which are employed in the top coat compositions of the present invention are the partial hydrolysis and condensation products of alkoxy functional silanes, preferably alkyltrialkoxysilanes, preferably those alkyltrialkoxysilanes wherein the alkyl group contains from 1 to about 8 carbon atoms, and aryltrialkoxysilanes, preferably phenyltriakoxysilanes, or mixtures thereof, wherein the alkoxy group contains from 1 to about 8 carbon atoms, such as, for example, methoxy, ethoxy, isopropoxy, butoxy, pentoxy, hexoxy, octoxy, and the like. These further-curable organopolysiloxanes are generally prepared by a process wherein the alkyltrialkoxysilane and aryltrialkoxysilane is heated in the presence of water, wherein the molar ratio of water to total silane is at least about 1.5:1 and in the presence of an effective amount of a hydrolysis catalyst, such as a mineral acid, for example, HCl, for about 1 to about 10 hours at a temperature between ambient and reflux to produce a siloxane partial condensation product; the partial condensation product is then concentrated by heating to remove 50 to about 90 mole percent alkanol by-product and some water, and thereafter, the concentrated partial condensation product is precured by heating at a temperature below the gel point thereof and generally in the range of about 700 to 300° C. to produce the solvent-soluble, further curable organopolysiloxane. This precured solvent-soluble, further curable organopolysiloxane is then dissolved in a suitable solvent to form the top-coat composition and the chrome layer 21 is then coated with this top coat composition. The solvent is then evaporated and the residual further curable organopolysiloxane is cured to a thermoset state to provide a top coat. The curing is effected at elevated temperatures in the range of about 50° to 135° C. for times between about 1 hour to about 72 hours, depending on the temperature at which the cure is effected. The silicone top coat generally should be cured preferably at an elevated temperature to effect the proper cure.

One particular further curable organopolysiloxane that can be employed in the top coat composition of the instant invention is the partial hydrolysis and condensation product of methyltriethoxysilane. This further curable organopolysiloxane is prepared by hydrolyzing methyltriethoxysilane with water in the presence of an effective amount of a hydrolysis catalyst, such as HCl, for about 1 to 10 hours at a temperature generally between 40° C. and reflux temperature, to product a partial condensation product. This partial condensation product is then concentrated by heating to remove some of the alkanol by-product and water. This concentrated product is then partially pre-cured at a temperature of about 70° to about 300° C. and below the gel point thereof and then solidified to provide a solid, solvent-soluble, further curable organopolysiloxane is then dissolved to a desired concentration in a suitable solvent to form the top coat composition. The top coat composition is then applied to the primed polycarbonate substrate, after which the solvent is evaporated and the further curable organopolysiloxane finally cured to provide a hard, abrasion and chemical solvent resistant, thermoset organopolysiloxane top coat on the polycarbonate substrate.

Another further curable organopolysiloxane which may be employed in the practice of the present invention is the partial hydrolysis and condensation product of a mixture of methyltriethoxysilane and phenyltriethoxysilane. This organopolysiloxane is prepared by hydrolyzing a mixture of methyltriethoxysilane and phenyltriethoxysilane with water in the presence of a hydrolysis catalyst such as HCl to produce a partial condensation product. This partial condensation product is then concentrated by heating to remove a substantial amount of the alkanol by-product and some water. This concentrated product is then partially pre-cured by heating and then solidified to provide a solid, solvent-soluble, further curable organopolysiloxane. The solid, solvent-soluble, further curable organopolysiloxane is then dissolved to a desired concentration in a suitable solvent to form the top coat composition containing a further curable organopolysiloxane. The top coat composition is then applied to the primed polycarbonate substrate, after which the solvent is evaporated and the further curable organopolysiloxane is finally cured to provide a tenaciously and durably adhered, abrasion and chemical resistant thermoset organopolysiloxane top coat on the polycarbonate substrate.

These are not the only silicones that may be utilized in the top coats of the instant invention. Also useful are silicone resins composed of trifunctional and difunctional units, silicone resins composed of trifunctional units, difunctional units and tetrafunctional units where the organo substituent groups in the trifunctional units may be selected from hydrocarbon radicals of 1 to about 8 carbon atoms and are preferably methyl, phenyl and vinyl; and wherein the organo substituent groups in the difunctional siloxy units may be selected from hydrocarbon units of from 1 to about 8 carbon atoms, preferably alkyl radicals, vinyl radicals and phenyl radicals. Such silicone resins usually have an organic to silicone atom ratio of 1:1 to 1.9:1, may have a silanol content that varies anywhere from 4 to 10 weight percent and optionally may have an alkoxy content that varies from 2 to 4%. The preparation of such silicone resins which may be utilized as top coats in the invention of the instant case are, for instance, to be found in U.S. Pat. Nos. 3,375,223; 3,435,001; 3,450,672; 3,790,527; 3,832,319; 3,865,766; 3,887,514 and 3,925,276.

These silicones may also contain fillers such as, for example, glass, talc and silica, preferably colloidal silica.

The coating compositions containing the afore-described silicones are simply brushed, dipped, sprayed or flowed on top of the primer layer that is applied to the polycarbonate substrate. The solvent, or alcohol by-product and water, present in the top coat composition is evaporated and the residual further curable organopolysiloxane is cured to form a thermoset organopolysiloxane top coat. Preferably, the further curable organopolysiloxane is cured at elevated temperatures. Although certain catalysts may be utilized to accelerate the cure of the further curable organopolysiloxane, such catalysts are not necessary if the further curable organopolysiloxane is cured by itself at the elevated temperature for a sufficient length of time.

The silicone resin layer 22 can also be applied by well known, standard and conventional chemical vapor deposition, particularly plasma enhanced chemical vapor deposition, processes and physical vapor deposition sputtering processes.

Chemical vapor deposition (CVD) is defined as the formation of a non-volatile solid film on a substrate by the reaction of vapor phase reactants that contain desired components. The gases are introduced into a reactor vessel, and decompose and react at a heated surface on the substrate to form the desired film.

CVD is generally classified into one of three types. The first two are principally predicated upon reactor pressure, and are designated as atmospheric pressure chemical vapor deposition (APCVD) or low pressure chemical vapor deposition (LPCVD).

A third category is referred to as plasma enhanced chemical vapor deposition (PECVD). Rather than relying solely on thermal energy to initiate and sustain chemical reactions, PECVD uses a radio frequency (RF) induced glow discharge or direct current or microwaves to transfer energy into the reactant gases, allowing the substrate to remain at lower temperature than in APCVD or LPCVD processes. Specifically, the plasma-inducing glow discharge is generated by the application of an RF field to a low pressure gas, thereby creating free electrons within the discharge region. The electrons gain sufficient energy from the electric field so that when they collide with gas molecules, gas-phase dissociation and ionization of the reactant gases (i.e., inducement into the plasma state) then occurs. Lower substrate temperature is the major advantage of PECVD, and provides a method of depositing films on some substrates which do not have the thermal stability to accept coating by other methods. In addition, PECVD can enhance the deposition rate when compared to thermal reactions alone, and produces films of unique compositions and properties.

Plasma enhanced chemical vapor deposition processes and reactors are disclosed, inter alia, in U.S. Pat. Nos. 5,646,435; 5,646,050; 4,888199; 5,628,829; 5,643,364 and 5,628,869, all of which are incorporated herein by reference.

In certain situations the silicone top coat may not adhere sufficiently well to the chrome layer. In such cases a primer layer may optionally be applied onto the chrome layer and the silicone top coat applied over the primer layer. Polyacrylates and polymethacrylates are useful as primer layers.

The dry thickness of the silicone resin layer is a thickness at least effective to protect the underlying chrome from scratching, abrasion and corrosion layer. Generally this thickness is from about 0.05 mil to about 2 mils, preferably from about 0.1 mil to about 0.5 mil, and more preferably from about 0.2 mil to about 0.3 mil.

In order that the invention may be more readily understood the following example is provided. The example is illustrative and does not limit the invention thereto.

EXAMPLE 1

A steel substrate is ultrasonically cleaned and then heated at 250° F. to remove moisture. A basecoat polymeric composition is applied onto the cleaned and dried steel substrate by a standard and conventional high volume low pressure gun. The polymer is comprised of 35 weight percent styrenated acrylic resin, 30 weight percent melamine formaldehyde resin, and 35 weight percent bisphenol A epoxy resin. The polymer is dissolved in sufficient solvents to provide a polymeric composition containing about 43 weight percent solids. After the basecoat is applied onto the substrate the substrate is allowed to sit for 20 minutes for ambient solvent flash off. The substrate is then baked at 375° F. for two hours. The resulting cured polymeric basecoat has a thickness of about 0.8 mil.

The basecoated substrate is placed on a metallizing rack. The metallizing rack is placed in a metallizing carriage which is placed inside a vacuum chamber. The chamber is evacuated to a vacuum level of 5×10E-5 torr. About 50 standard cubic centimeters per minute of argon is introduced into the chamber. An electric arc is struck at the end of a chrome target. As the arc travels from the back end of the target to the front, its polarity is reversed, thereby causing the arc to move back and forth to evaporate the chrome target and deposit it on the basecoated substrate. A current of 500 amps is applied to the target. After five minutes of deposition the argon flow rate is increased to 75 standard cubic centimeters per minute, and deposition is continued for another five minutes. The substrate is allowed to cool and the chamber is vented. The thickness of the chrome layer is 800 Angstroms.

A silicone top coat is applied onto the chrome layer. The silicone top coating is carried out in two stages. A primer composition comprising polymethylmethacrylate dissolved in solvent (two weight percent solids) is sprayed onto the chrome layer. The primer is flashed off for a period of 10 minutes to evaporate off the solvents. A silicone top coat composition is sprayed onto the primer layer. The silicone composition contains 20 weight percent solids dissolved in solvents. The silicone polymer is commercially available, well known and conventional, and is prepared by cohydrolyzing organochlorosilanes to form resin intermediates high in silanol groups. The organochlorosilanes include methylchlorosilanes and ethylchlorosilanes. The resin intermediate is subsequently condensed to form a complex polysiloxane polymer. The silicone top coat composition contains ultraviolet light inhibitors. The silicone top coat composition is flashed off for 20 minutes and baked at 260° F. for one hour. The dry thickness of the silicone resin layer is seven microns.

While certain embodiments of the invention have been described for purposes of illustration, it is to be understood that there may be other additional various embodiments and modifications within the general scope of the invention.

I claim:
1. An article having on at least a portion of its surface a multi-layer coating comprising:
    a basecoat layer comprised of polymeric material directly on at least a portion of said surface;
    a single, metallic, decorative layer of chrome directly on said basecoat layer; and
    a topcoat layer comprised of organopolysiloxane directly on said layer of chrome.
2. The article of claim 1 wherein said polymeric material is selected from polycarbonate, polyacrylate, polymethacrylate, polyester, acrylonitrile-butadiene-styrene, nylon, polystyrene, styrene-butadiene, styrene-acrylonitrile, blends and copolymers thereof.
3. The article of claim 1 wherein said article is comprised of metal.
4. The article of claim 1 wherein said article is comprised of metal alloy.
5. The article of claim 1 wherein said article is comprised of plastic.
6. The article of claim 1 wherein said organopolysiloxane is a silicone resin.
7. The article of claim 2 wherein said organopolysiloxane is a silicone resin.

* * * * *